(12) United States Patent
Ren et al.

(10) Patent No.: US 11,928,521 B2
(45) Date of Patent: Mar. 12, 2024

(54) BRING YOUR OWN MACHINE (BYOM)

(71) Applicant: UiPath, Inc., New York, NY (US)

(72) Inventors: Jingtao Ren, Redmond, WA (US); Tao Ma, Bellevue, WA (US); Tarek Madkour, Sammamish, WA (US); Runnan Jia, Kirkland, WA (US); Clement Fauchere, Sammamish, WA (US)

(73) Assignee: UiPath, Inc., New York, NY (US)

( * ) Notice: Subject to any disclaimer, the term of this patent is extended or adjusted under 35 U.S.C. 154(b) by 382 days.

(21) Appl. No.: 17/233,454

(22) Filed: Apr. 17, 2021

(65) Prior Publication Data
US 2022/0334885 A1 Oct. 20, 2022

(51) Int. Cl.
G06F 9/50 (2006.01)
G06F 9/455 (2018.01)
G06F 21/10 (2013.01)

(52) U.S. Cl.
CPC ........ *G06F 9/5077* (2013.01); *G06F 9/45533* (2013.01); *G06F 21/10* (2013.01); *G06F 2009/45575* (2013.01); *G06F 2009/45587* (2013.01); *G06F 2009/45595* (2013.01)

(58) Field of Classification Search
CPC ..... G06F 9/5077; G06F 9/45533; G06F 21/10
See application file for complete search history.

(56) References Cited

U.S. PATENT DOCUMENTS

| | | | |
|---|---|---|---|
| 8,141,090 B1* | 3/2012 | Graupner | G06F 9/5077 718/1 |
| 9,372,735 B2 | 6/2016 | Calder et al. | |
| 9,588,511 B2 | 3/2017 | Gray | |
| 9,846,899 B1* | 12/2017 | Stickle | G06F 21/10 |
| 10,045,174 B1 | 8/2018 | Rao | |
| 10,853,114 B2 | 12/2020 | Agarwal et al. | |
| 11,068,136 B1* | 7/2021 | Koushik | G06F 3/0482 |
| 11,176,443 B1* | 11/2021 | Selva | G06F 18/25 |

(Continued)

FOREIGN PATENT DOCUMENTS

| | | |
|---|---|---|
| CN | 105389215 A | 3/2016 |
| CN | 107038064 A | 8/2017 |
| KR | 1020100113415 A | 10/2010 |

OTHER PUBLICATIONS

International Search Report & Written Opinion, dated Feb. 15, 2022, PCT Patent Application No. PCT/US21/56959.

(Continued)

*Primary Examiner* — Dong U Kim
(74) *Attorney, Agent, or Firm* — LeonardPatel PC; Sheetal S. Patel; Michael A. Leonard, II

(57) ABSTRACT

A method and/or apparatus for creating and/or editing a machine pool with bring your own machine (BYOM) includes creating and/or editing a machine pool with a static list of machines. A user input machine list and an existing machine list are retrieved, and the user input machine list and existing machine list are compared to identify one or more changes between the user input machine list and existing machine list. Next, a new machine specification is created when the one or more changes between the user input machine list and existing machine list are identified. The one or more machines are then moved to the new machine specification.

21 Claims, 19 Drawing Sheets

(56) References Cited

U.S. PATENT DOCUMENTS

| | | | |
|---|---|---|---|
| 2012/0030673 A1* | 2/2012 | Sakamoto | G06F 9/45558 718/1 |
| 2013/0254903 A1 | 9/2013 | Araki | |
| 2014/0137259 A1 | 5/2014 | Chen et al. | |
| 2014/0181488 A1 | 6/2014 | Sama et al. | |
| 2014/0200036 A1* | 7/2014 | Egner | H04W 64/00 455/456.3 |
| 2014/0282821 A1* | 9/2014 | Adler | H04L 63/10 726/1 |
| 2014/0282916 A1* | 9/2014 | Gast | H04W 12/08 726/4 |
| 2015/0010304 A1 | 1/2015 | Deore et al. | |
| 2015/0242594 A1* | 8/2015 | Harjula | G06F 21/57 726/2 |
| 2015/0281276 A1* | 10/2015 | U | H04L 63/10 726/1 |
| 2015/0310188 A1* | 10/2015 | Ford | H04L 63/0428 726/28 |
| 2016/0180063 A1* | 6/2016 | Bhandaru | G06F 21/105 726/26 |
| 2016/0255117 A1* | 9/2016 | Sinha | G06F 21/572 726/1 |
| 2018/0253261 A1* | 9/2018 | Kripalani | G06F 3/067 |
| 2018/0332069 A1 | 11/2018 | Moore et al. | |
| 2019/0332508 A1* | 10/2019 | Goyal | G06F 11/3414 |
| 2020/0306970 A1* | 10/2020 | Latkar | G06F 11/0766 |
| 2021/0107140 A1 | 4/2021 | Singh et al. | |
| 2022/0156124 A1* | 5/2022 | Nandavanam | G06F 9/5027 |

OTHER PUBLICATIONS

Extended European Search Report, dated Aug. 16, 2023, EP Patent Application No. 21824267.5.

* cited by examiner

FIG. 11

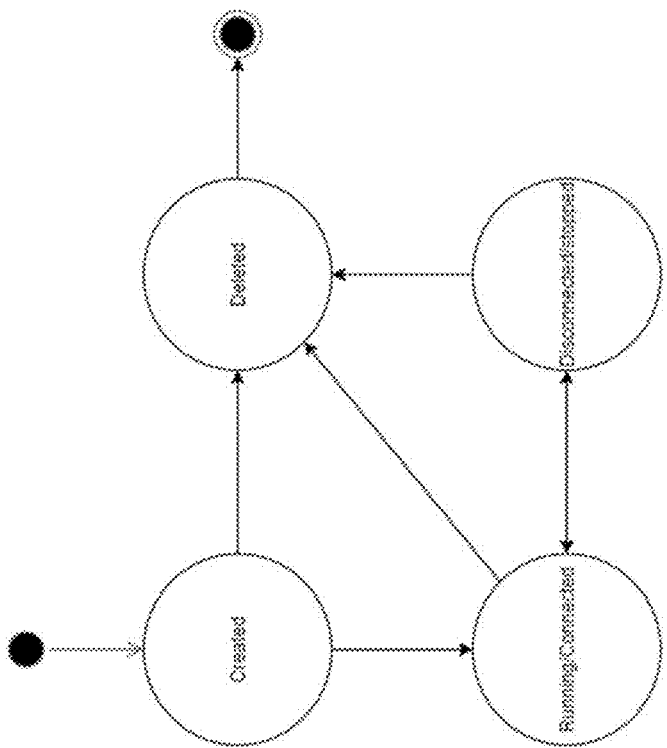

BRING YOUR OWN MACHINE (BYOM)

FIELD

The present invention generally relates to robotic process automation (RPA), and more specifically, to incorporating BYOM with RPA.

BACKGROUND

Prior to cloud robots, customers manually configure the physical machine and install robots to connect their computing systems (e.g., virtual machines) to UiPath® Orchestrator™. In order to connect the computing systems to UiPath® Orchestrator™, a license key is handed over to a user preparing the computing system. This license key is usually transferred by email, short messaging system (SMS), Slack®, and phone call, to name a few. This method of handing over the license key is not secure and nor is the channel, i.e., the means in which the license key is handed over.

Accordingly, an improved method for connecting a cloud robot to Orchestrator™ in a secure manner may be beneficial.

SUMMARY

Certain embodiments of the present invention may provide solutions to the problems and needs in the art that have not yet been fully identified, appreciated, or solved by current cloud robot technologies. For example, some embodiments of the present invention pertain to connecting cloud robots to a BYOM model.

In an embodiment, a computer-implemented method for creating and/or editing a machine pool with bring your own machine (BYOM) includes creating and/or editing a machine pool with a static list of machines. The method also includes retrieving a user input machine list and an existing machine list, and comparing the user input machine list and existing machine list to identify one or more changes between the user input machine list and existing machine list. The method further includes creating a new machine specification when the one or more changes between the user input machine list and existing machine list are identified. The method also includes moving or importing one or more machines to the new machine specification.

In another embodiment, a computer program is embodied on a non-transitory computer readable medium. The computer program is configured to cause one or more processors to create and/or edit a machine pool with bring your own machine (BYOM). The computer program is further configured to cause the one or more processors to create and/or edit a machine pool with a static list of machines. The computer program is further configured to cause the one or more processors to retrieve a user input machine list and an existing machine list, and comparing the user input machine list and existing machine list to identify one or more changes between the user input machine list and existing machine list. The computer program is further configured to cause the one or more processors to create a new machine specification when the one or more changes between the user input machine list and existing machine list are identified. The computer program is further configured to cause the one or more processors to move or importing one or more machines to the new machine specification.

In yet another embodiment, a system to create and/or edit a machine pool with bring your own machine (BYOM) includes memory configured to store one or more computer-executable instructions and one or more processors configured to execute the one or more instructions to perform creating and/or editing a machine pool with a static list of machines. The one or more processors are further configured to execute the one or more instructions to perform retrieving a user input machine list and an existing machine list, and comparing the user input machine list and existing machine list to identify one or more changes between the user input machine list and existing machine list. The one or more processors are further configured to execute the one or more instructions to perform creating a new machine specification when the one or more changes between the user input machine list and existing machine list are identified. The one or more processors are further configured to execute the one or more instructions to perform moving or importing one or more machines to the new machine specification.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 11 is a graphical user interface (GUI) illustrating a user creating a virtual machine, according to an embodiment of the present invention.

FIG. 19 is a relationship diagram illustrating a statement machine of a machine, according to an embodiment of the present invention.

DETAILED DESCRIPTION OF THE EMBODIMENTS

Some embodiments pertain to bring your own machine (BYOM), which is a feature that has been added to cloud robot. For example, customers may port over their subscription credentials, allowing for infrastructural changes to be made within the customer's subscription. The infrastructural changes incorporate the schedule of cloud robots into the subscription.

It should be noted, however, that there may be problems when making these infrastructure changes in the customer's subscription. For example, there may be numerous customization needs for the machine, i.e., the machine may require a virtual private network (VPN) connection to communicate with a database. Another example may be the requirement to have an extension installed.

Based on these customization needs for the BYOM, a cloud robot customized to address these needs is installed and/or deployed.

Another problem that is being solved is allowing customers to get special access to their own network. This plays with existing cloud robot scenario, i.e., the idea that with cloud robots, the machine is created and scaled automatically. However, some customers are not interested in the creation of the machine and scaling, since the customer may have a unique machine configuration.

To address this problem, the customer creates the machine, and the customer then provides the unique machine configuration to the cloud robot developer. The cloud robot developer may then optimize the cloud cost usage for the unique machine configuration (or for each machine). This way, when a new job is received, the cloud robot developer starts the machine, and when the machine is no longer needed, the machine is turned off.

Continuing with this example, let's say that the customer created 10 machines. In this example, instead of leaving the 10 machines in an ON state the entire time, resulting in paying Azure™ or AWS™ costs, the cloud robot developer turns ON one or more of the machines when needed and also turns the one or more machines OFF when not needed. The same kind of cloud robot goodness as with autoscaling or optimizing for performance can be accomplished with BYOM. In other words, cloud robot goodness is brought to the custom created BYOM.

In some embodiments, a customer may create a plurality of virtual machines (VMs) in the cloud, and in addition, these VMs may participate in the RPA ecosystem. For example, the customer provides one or more VMs in the cloud, and robots are installed into the one or more VMs. These robots may connect the VMs automatically to the RPA environment, and may be turned on or off automatically.

Figure 1:
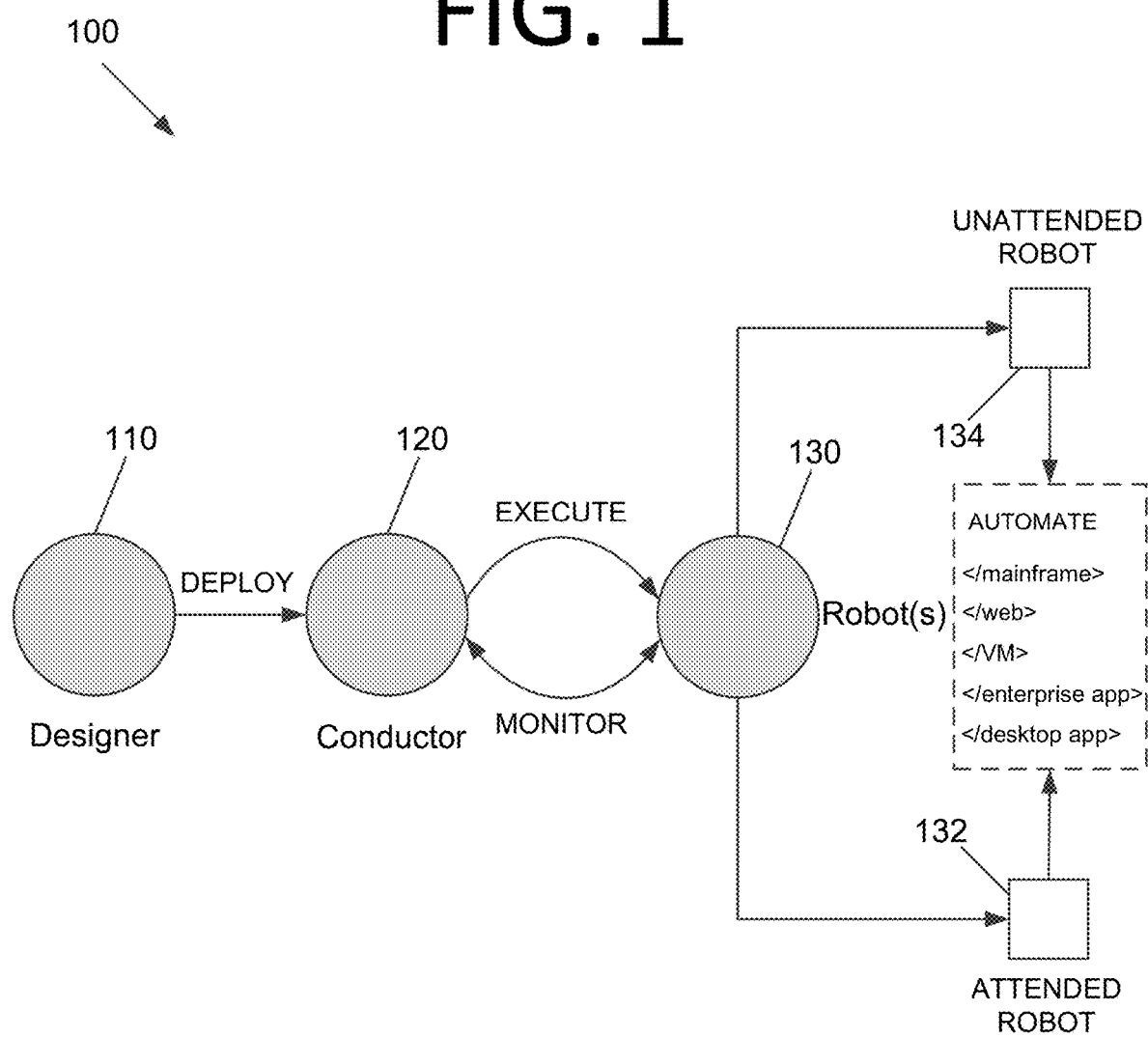
FIG. 1 is an architectural diagram illustrating an RPA system, according to an embodiment of the present invention.

FIG. 1 is an architectural diagram illustrating an RPA system 100, according to an embodiment of the present invention. RPA system 100 includes a designer 110 that allows a developer to design and implement workflows. Designer 110 may provide a solution for application integration, as well as automating third-party applications, administrative Information Technology (IT) tasks, and business IT processes. Designer 110 may facilitate development of an automation project, which is a graphical representation of a business process. Simply put, designer 110 facilitates the development and deployment of workflows and robots.

The automation project enables automation of rule-based processes by giving the developer control of the execution order and the relationship between a custom set of steps developed in a workflow, defined herein as "activities." One commercial example of an embodiment of designer 110 is UiPath Studio™. Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 110, execution of business processes is orchestrated by conductor 120, which orchestrates one or more robots 130 that execute the workflows developed in designer 110. One commercial example of an embodiment of conductor 120 is UiPath Orchestrator™. Conductor 120 facilitates management of the creation, monitoring, and deployment of resources in an environment. Conductor 120 may act as an integration point with third-party solutions and applications.

Conductor 120 may manage a fleet of robots 130, connecting and executing robots 130 from a centralized point. Types of robots 130 that may be managed include, but are not limited to, attended robots 132, unattended robots 134, development robots (similar to unattended robots 134, but used for development and testing purposes), and nonproduction robots (similar to attended robots 132, but used for development and testing purposes). Attended robots 132 are triggered by user events and operate alongside a human on the same computing system. Attended robots 132 may be used with conductor 120 for a centralized process deployment and logging medium. Attended robots 132 may help the human user accomplish various tasks, and may be triggered by user events. In some embodiments, processes cannot be started from conductor 120 on this type of robot and/or they cannot run under a locked screen. In certain embodiments, attended robots 132 can only be started from a robot tray or from a command prompt. Attended robots 132 should run under human supervision in some embodiments.

Unattended robots 134 run unattended in virtual environments and can automate many processes. Unattended robots 134 may be responsible for remote execution, monitoring, scheduling, and providing support for work queues. Debugging for all robot types may be run in designer 110 in some embodiments. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

Conductor 120 may have various capabilities including, but not limited to, provisioning, deployment, configuration, queueing, monitoring, logging, and/or providing interconnectivity. Provisioning may include creating and maintenance of connections between robots 130 and conductor 120 (e.g., a web application). Deployment may include assuring the correct delivery of package versions to assigned robots 130 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 120 may provide interconnectivity by acting as the centralized point of communication for third-party solutions and/or applications.

Robots 130 are execution agents that run workflows built in designer 110. One commercial example of some embodiments of robot(s) 130 is UiPath Robots™. In some embodiments, robots 130 install the Microsoft Windows® Service Control Manager (SCM)-managed service by default. As a result, such robots 130 can open interactive Windows® sessions under the local system account, and have the rights of a Windows® service.

In some embodiments, robots 130 can be installed in a user mode. For such robots 130, this means they have the same rights as the user under which a given robot 130 has been installed. This feature may also be available for High Density (HD) robots, which ensure full utilization of each machine at its maximum potential. In some embodiments, any type of robot 130 may be configured in an HD environment.

Robots 130 in some embodiments are split into several components, each being dedicated to a particular automation task. The robot components in some embodiments include, but are not limited to, SCM-managed robot services, user mode robot services, executors, agents, and command line. SCM-managed robot services manage and monitor Windows® sessions and act as a proxy between conductor 120 and the execution hosts (i.e., the computing systems on which robots 130 are executed). These services are trusted with and manage the credentials for robots 130. A console application is launched by the SCM under the local system.

User mode robot services in some embodiments manage and monitor Windows® sessions and act as a proxy between conductor 120 and the execution hosts. User mode robot services may be trusted with and manage the credentials for robots 130. A Windows® application may automatically be launched if the SCM-managed robot service is not installed.

Executors may run given jobs under a Windows® session (i.e., they may execute workflows. Executors may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. The command line is a client of the service. The command line is a console application that can request to start jobs and waits for their output.

Having components of robots 130 split as explained above helps developers, support users, and computing systems more easily run, identify, and track what each component is executing. Special behaviors may be configured per component this way, such as setting up different firewall rules for the executor and the service. The executor may always be aware of DPI settings per monitor in some embodiments. As a result, workflows may be executed at any DPI, regardless of the configuration of the computing system on which they were created. Projects from designer 110 may also be independent of browser zoom level in some embodiments. For applications that are DPI-unaware or intentionally marked as unaware, DPI may be disabled in some embodiments.

Figure 2:
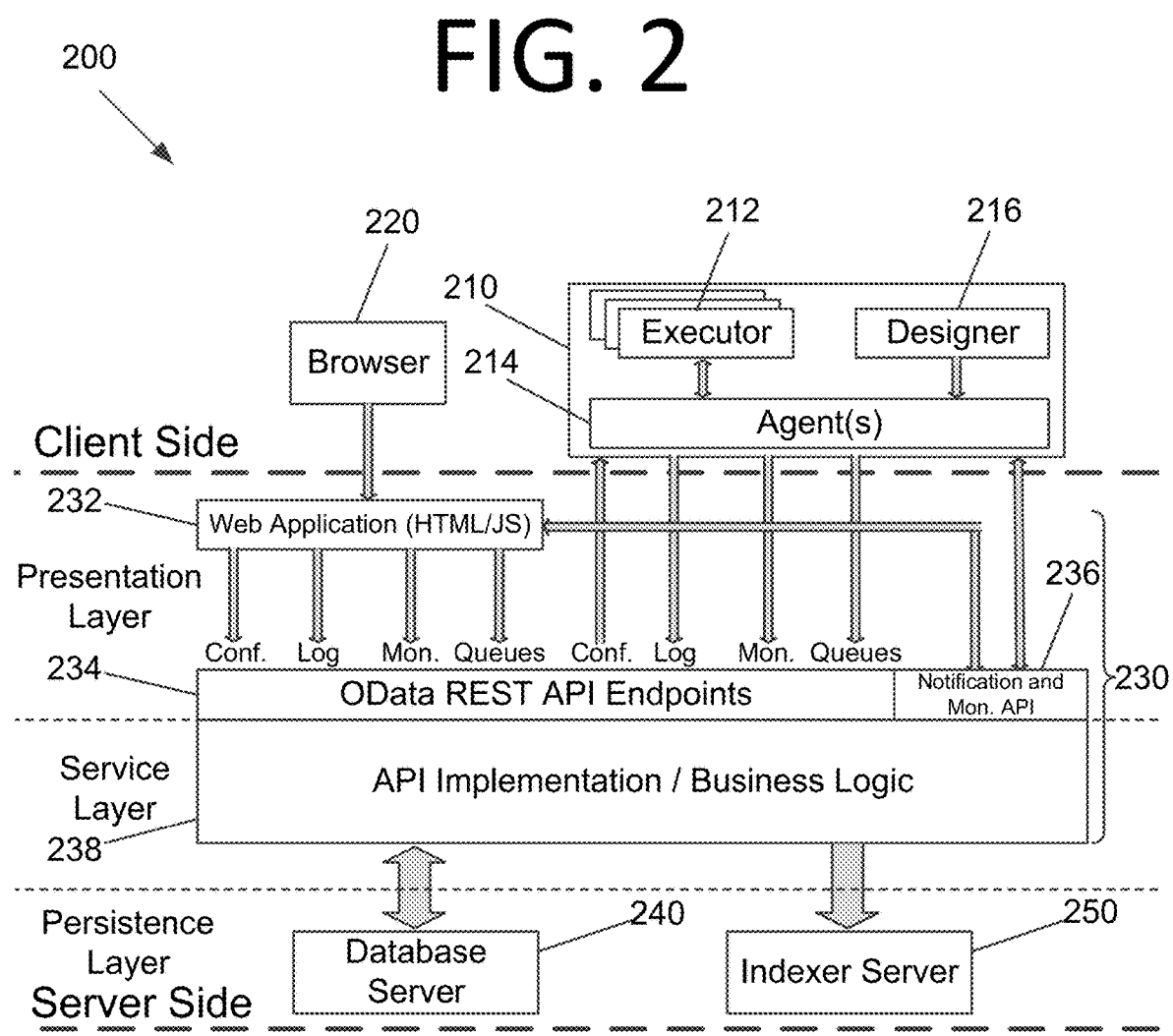
FIG. 2 is an architectural diagram illustrating a deployed RPA system, according to an embodiment of the present invention.

FIG. 2 is an architectural diagram illustrating a deployed RPA system 200, according to an embodiment of the present invention. In some embodiments, RPA system 200 may be, or may be a part of, RPA system 100 of FIG. 1. It should be noted that the client side, the server side, or both, may include any desired number of computing systems without deviating from the scope of the invention. On the client side, a robot application 210 includes executors 212, an agent 214, and a designer 216. However, in some embodiments, designer 216 may not be running on computing system 210. Executors 212 are running processes. Several business projects may run simultaneously, as shown in FIG. 2. Agent 214 (e.g., a Windows® service) is the single point of contact for all executors 212 in this embodiment. All messages in this embodiment are logged into conductor 230, which processes them further via database server 240, indexer server 250, or both. As discussed above with respect to FIG. 1, executors 212 may be robot components.

In some embodiments, a robot represents an association between a machine name and a username. The robot may manage multiple executors at the same time. On computing systems that support multiple interactive sessions running simultaneously (e.g., Windows® Server 2012), multiple robots may be running at the same time, each in a separate Windows® session using a unique username. This is referred to as HD robots above.

Agent 214 is also responsible for sending the status of the robot (e.g., periodically sending a "heartbeat" message indicating that the robot is still functioning) and downloading the required version of the package to be executed. The communication between agent 214 and conductor 230 is always initiated by agent 214 in some embodiments. In the notification scenario, agent 214 may open a WebSocket channel that is later used by conductor 230 to send commands to the robot (e.g., start, stop, etc.).

On the server side, a presentation layer (web application 232, Open Data Protocol (OData) Representative State Transfer (REST) Application Programming Interface (API) endpoints 234, and notification and monitoring 236), a service layer (API implementation/business logic 238), and a persistence layer (database server 240 and indexer server 250) are included. Conductor 230 includes web application 232, OData REST API endpoints 234, notification and monitoring 236, and API implementation/business logic 238. In some embodiments, most actions that a user performs in the interface of conductor 230 (e.g., via browser 220) are performed by calling various APIs. Such actions may include, but are not limited to, starting jobs on robots, adding/removing data in queues, scheduling jobs to run unattended, etc. without deviating from the scope of the invention. Web application 232 is the visual layer of the server platform. In this embodiment, web application 232 uses Hypertext Markup Language (HTML) and JavaScript (JS). However, any desired markup languages, script languages, or any other formats may be used without deviating from the scope of the invention. The user interacts with web pages from web application 232 via browser 220 in this embodiment in order to perform various actions to control conductor 230. For instance, the user may create robot groups, assign packages to the robots, analyze logs per robot and/or per process, start and stop robots, etc.

In addition to web application 232, conductor 230 also includes service layer that exposes OData REST API endpoints 234. However, other endpoints may be included without deviating from the scope of the invention. The REST API is consumed by both web application 232 and agent 214. Agent 214 is the supervisor of one or more robots on the client computer in this embodiment.

The REST API in this embodiment covers configuration, logging, monitoring, and queueing functionality. The configuration endpoints may be used to define and configure application users, permissions, robots, assets, releases, and environments in some embodiments. Logging REST endpoints may be used to log different information, such as errors, explicit messages sent by the robots, and other environment-specific information, for instance. Deployment REST endpoints may be used by the robots to query the package version that should be executed if the start job command is used in conductor 230. Queueing REST endpoints may be responsible for queues and queue item management, such as adding data to a queue, obtaining a transaction from the queue, setting the status of a transaction, etc.

Monitoring REST endpoints may monitor web application 232 and agent 214. Notification and monitoring API 236 may be REST endpoints that are used for registering agent 214, delivering configuration settings to agent 214, and for sending/receiving notifications from the server and agent 214. Notification and monitoring API 236 may also use Web Socket communication in some embodiments.

The persistence layer includes a pair of servers in this embodiment—database server 240 (e.g., a SQL server) and indexer server 250. Database server 240 in this embodiment stores the configurations of the robots, robot groups, associated processes, users, roles, schedules, etc. This information is managed through web application 232 in some embodiments. Database server 240 may manages queues and queue items. In some embodiments, database server 240 may store messages logged by the robots (in addition to or in lieu of indexer server 250).

Indexer server 250, which is optional in some embodiments, stores and indexes the information logged by the robots. In certain embodiments, indexer server 250 may be disabled through configuration settings. In some embodiments, indexer server 250 uses ElasticSearch®, which is an open source project full-text search engine. Messages logged by robots (e.g., using activities like log message or write line) may be sent through the logging REST endpoint(s) to indexer server 250, where they are indexed for future utilization.

Figure 3:
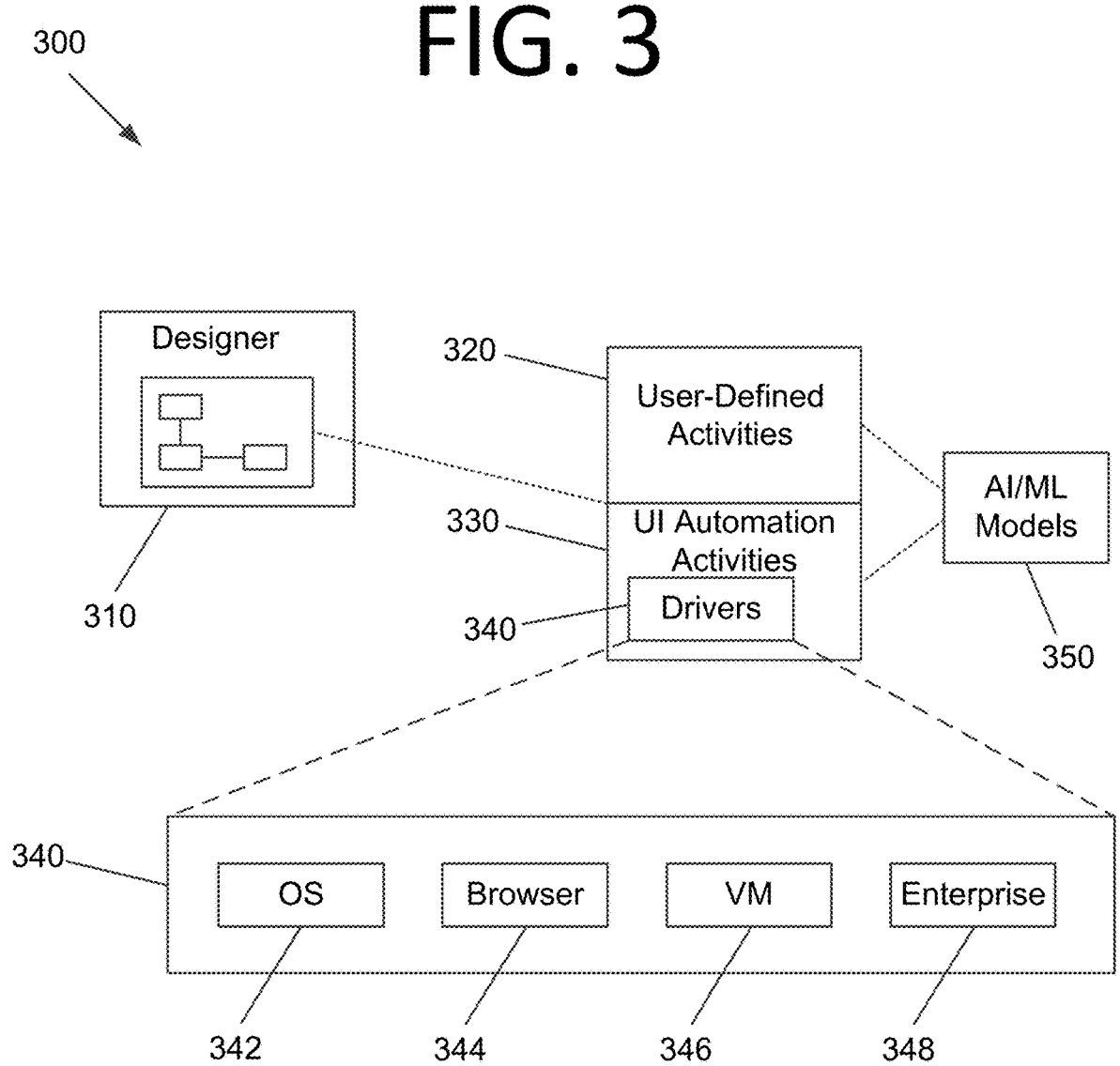
FIG. 3 is an architectural diagram illustrating the relationship between a designer, activities, and drivers, according to an embodiment of the present invention.

FIG. 3 is an architectural diagram illustrating the relationship 300 between a designer 310, activities 320, 330, drivers 340, and AI/ML models 350, according to an embodiment of the present invention. Per the above, a developer uses designer 310 to develop workflows that are executed by robots. Workflows may include user-defined activities 320 and UI automation activities 330. User-defined activities 320 and/or UI automation activities 330 may call one or more AI/ML models 350 in some embodiments, which may be located locally to the computing system on which the robot is operating and/or remotely thereto. Some embodiments are able to identify non-textual visual components in an image, which is called computer vision (CV) herein. Some CV activities pertaining to such components may include, but are not limited to, click, type, get text, hover, element exists, refresh scope, highlight, etc. Click in some embodiments identifies an element using CV, optical character recognition (OCR), fuzzy text matching, and multi-anchor, for example, and clicks it. Type may identify an element using the above and types in the element. Get text may identify the location of specific text and scan it using OCR. Hover may identify an element and hover over it. Element exists may check whether an element exists on the screen using the techniques described above. In some embodiments, there may be hundreds or even thousands of activities that can be implemented in designer 310. However, any number and/or type of activities may be available without deviating from the scope of the invention.

UI automation activities 330 are a subset of special, lower level activities that are written in lower level code (e.g., CV activities) and facilitate interactions with the screen. UI automation activities 330 facilitate these interactions via drivers 340 and/or AI/ML models 350 that allow the robot to interact with the desired software. For instance, drivers 340 may include OS drivers 342, browser drivers 344, VM drivers 346, enterprise application drivers 348, etc. One or more of AI/ML models 350 may be used by UI automation activities 330 in order to determine perform interactions with the computing system. In some embodiments, AI/ML models 350 may augment drivers 340 or replace them completely. Indeed, in certain embodiments, drivers 340 are not included.

Drivers 340 may interact with the OS at a low level looking for hooks, monitoring for keys, etc. They may facilitate integration with Chrome®, IE®, Citrix®, SAP®, etc. For instance, the "click" activity performs the same role in these different applications via drivers 340.

Figure 4:
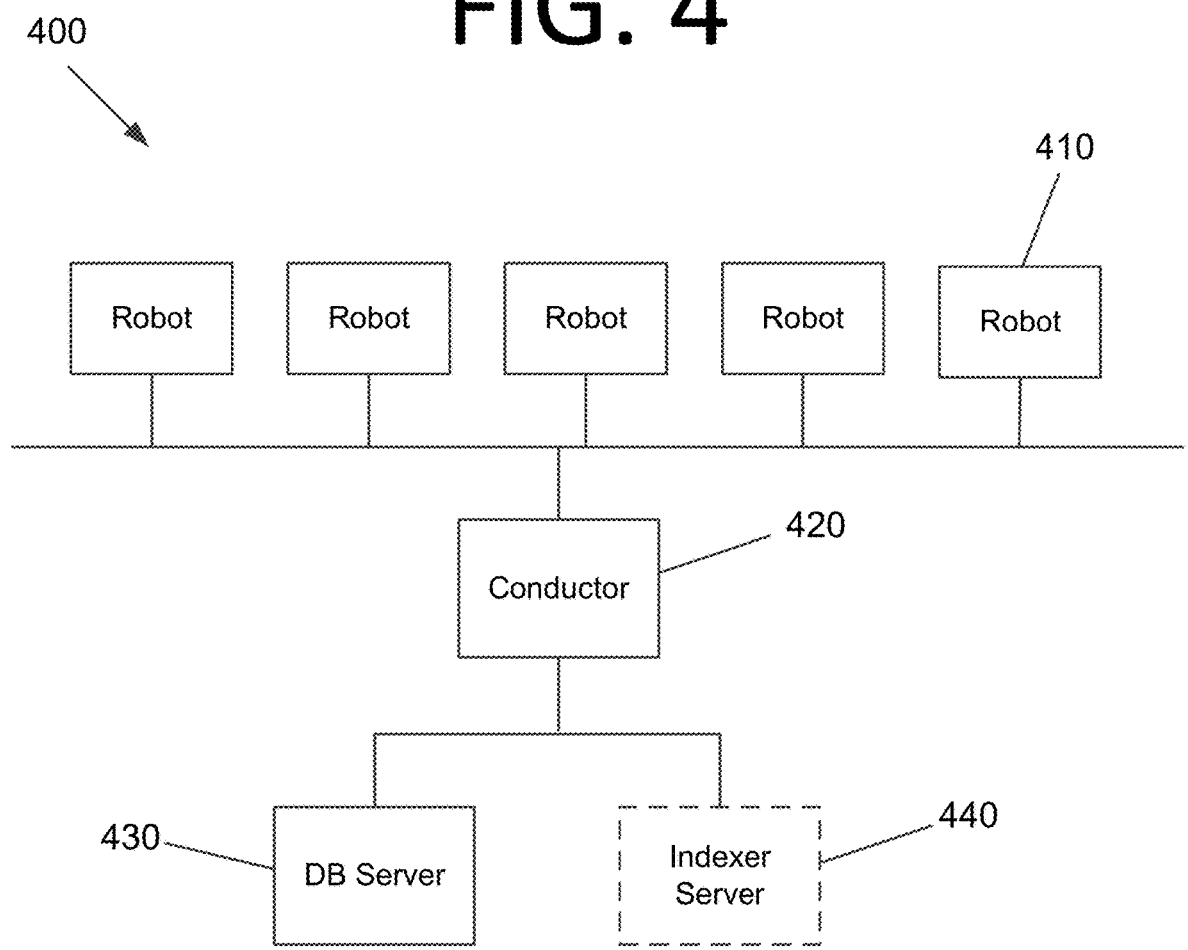
FIG. 4 is an architectural diagram illustrating an RPA system, according to an embodiment of the present invention.

FIG. 4 is an architectural diagram illustrating an RPA system 400, according to an embodiment of the present invention. In some embodiments, RPA system 400 may be or include RPA systems 100 and/or 200 of FIGS. 1 and/or 2. RPA system 400 includes multiple client computing systems 410 running robots. Computing systems 410 are able to communicate with a conductor computing system 420 via a web application running thereon. Conductor computing system 420, in turn, is able to communicate with a database server 430 and an optional indexer server 440.

With respect to FIGS. 1 and 3, it should be noted that while a web application is used in these embodiments, any suitable client/server software may be used without deviating from the scope of the invention. For instance, the conductor may run a server-side application that communicates with non-web-based client software applications on the client computing systems.

Figure 5:
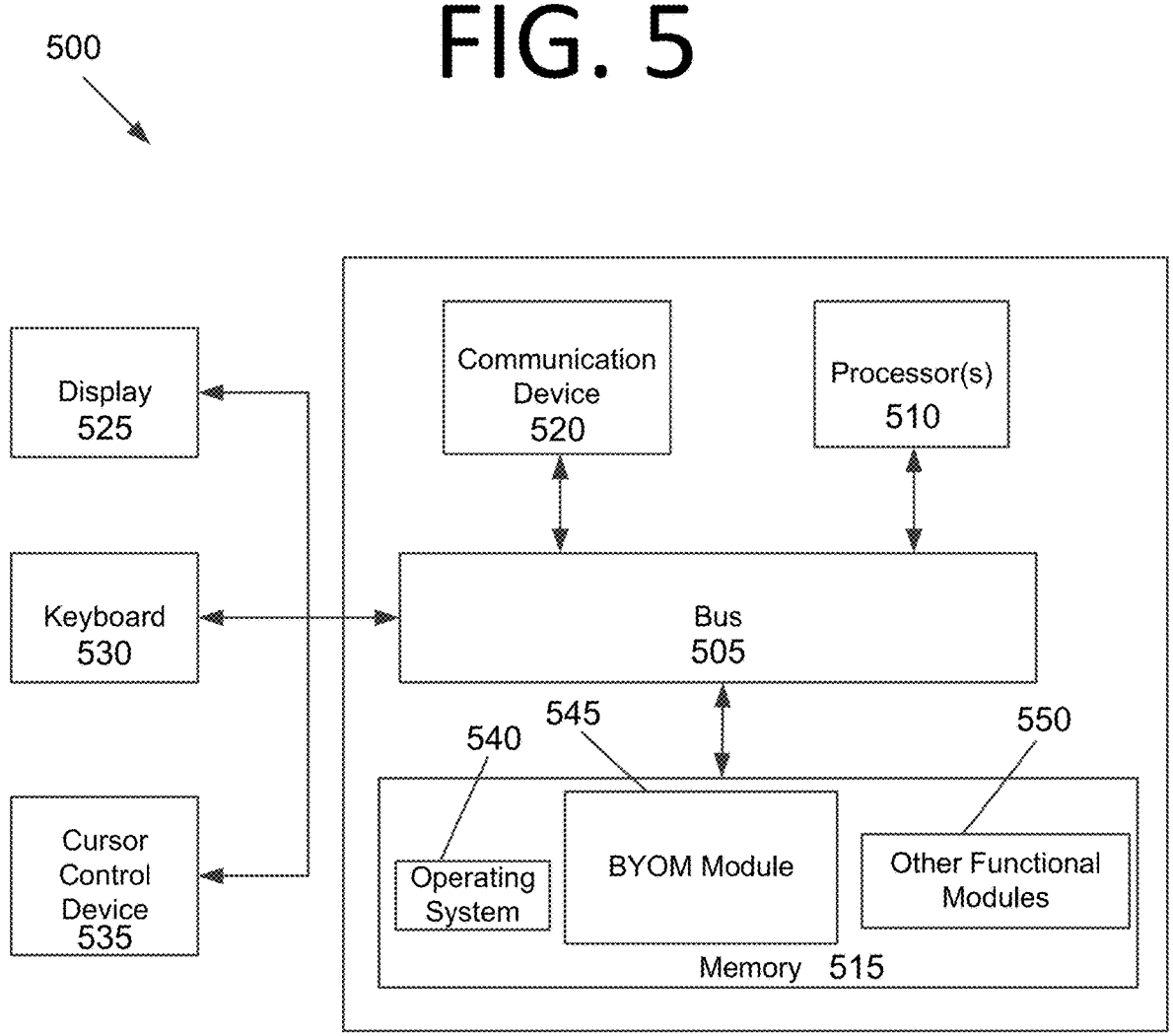
FIG. 5 is an architectural diagram illustrating a computing system configured to deploy cloud robots in BYOMs, according to an embodiment of the present invention.

FIG. 5 is an architectural diagram illustrating a computing system 500 configured to deploy cloud robots to BYOMs, according to an embodiment of the present invention. In some embodiments, computing system 500 may be one or more of the computing systems depicted and/or described herein. Computing system 500 includes a bus 505 or other communication mechanism for communicating information, and processor(s) 510 coupled to bus 505 for processing information. Processor(s) 510 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 510 may also have multiple processing cores, and at least some of the cores may be configured to perform specific functions. Multi-parallel processing may be used in some embodiments. In certain embodiments, at least one of processor(s) 510 may be a neuromorphic circuit that includes processing elements that mimic biological neurons. In some embodiments, neuromorphic circuits may not require the typical components of a Von Neumann computing architecture.

Computing system 500 further includes a memory 515 for storing information and instructions to be executed by processor(s) 510. Memory 515 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 510 and may include volatile media, non-volatile media, or both. The media may also be removable, non-removable, or both.

Additionally, computing system 500 includes a communication device 520, such as a transceiver, to provide access to a communications network via a wireless and/or wired connection. In some embodiments, communication device 520 may be configured to use Frequency Division Multiple Access (FDMA), Single Carrier FDMA (SC-FDMA), Time Division Multiple Access (TDMA), Code Division Multiple Access (CDMA), Orthogonal Frequency Division Multiplexing (OFDM), Orthogonal Frequency Division Multiple Access (OFDMA), Global System for Mobile (GSM) communications, General Packet Radio Service (GPRS), Universal Mobile Telecommunications System (UMTS), cdma2000, Wideband CDMA (W-CDMA), High-Speed Downlink Packet Access (HSDPA), High-Speed Uplink Packet Access (HSUPA), High-Speed Packet Access (HSPA), Long Term Evolution (LTE), LTE Advanced (LTE-A), 802.11x, Wi-Fi, Zigbee, Ultra-WideBand (UWB), 802.16x, 802.15, Home Node-B (HnB), Bluetooth, Radio Frequency Identification (RFID), Infrared Data Association (IrDA), Near-Field Communications (NFC), fifth generation (5G), New Radio (NR), any combination thereof, and/or any other currently existing or future-implemented communications standard and/or protocol without deviating from the scope of the invention. In some embodiments, communication device 520 may include one or more antennas that are singular, arrayed, phased, switched, beamforming, beamsteering, a combination thereof, and or any other antenna configuration without deviating from the scope of the invention.

Processor(s) 510 are further coupled via bus 505 to a display 525, such as a plasma display, a Liquid Crystal Display (LCD), a Light Emitting Diode (LED) display, a Field Emission Display (FED), an Organic Light Emitting Diode (OLED) display, a flexible OLED display, a flexible substrate display, a projection display, a 4K display, a high definition display, a Retina® display, an In-Plane Switching (IPS) display, or any other suitable display for displaying information to a user. Display 525 may be configured as a touch (haptic) display, a three dimensional (3D) touch display, a multi-input touch display, a multi-touch display, etc. using resistive, capacitive, surface-acoustic wave (SAW) capacitive, infrared, optical imaging, dispersive signal technology, acoustic pulse recognition, frustrated total internal reflection, etc. Any suitable display device and haptic I/O may be used without deviating from the scope of the invention.

A keyboard 530 and a cursor control device 535, such as a computer mouse, a touchpad, etc., are further coupled to bus 505 to enable a user to interface with computing system 500. However, in certain embodiments, a physical keyboard and mouse may not be present, and the user may interact with the device solely through display 525 and/or a touchpad (not shown). Any type and combination of input devices may be used as a matter of design choice. In certain embodiments, no physical input device and/or display is present. For instance, the user may interact with computing system 500 remotely via another computing system in communication therewith, or computing system 500 may operate autonomously.

Memory 515 stores software modules that provide functionality when executed by processor(s) 510. The modules include an operating system 540 for computing system 500. The modules further include a BYOM module 545 that is configured to perform all or part of the processes described herein or derivatives thereof. Computing system 500 may include one or more additional functional modules 550 that include additional functionality.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems. The computing system could be part of or otherwise accessible by a local area network (LAN), a mobile communications network, a satellite communications network, the Internet, a public or private cloud, a hybrid cloud, a server farm, any combination thereof, etc. Any localized or distributed architecture may be used without deviating from the scope of the invention.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 6:
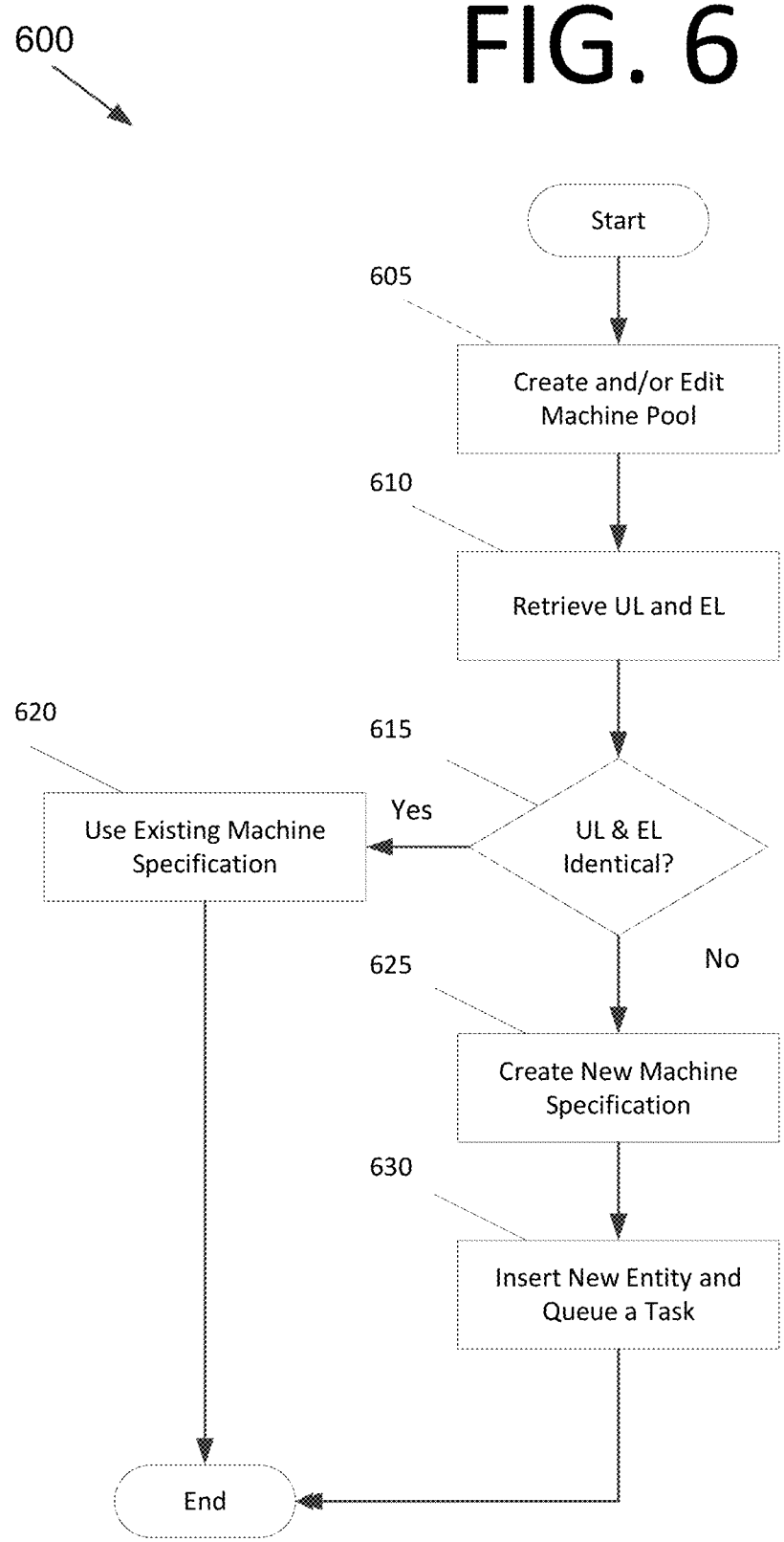
FIG. 6 is flow diagram illustrating a method for creating and/or editing a machine pool, according to an embodiment of the present invention.

FIG. 6 is flow diagram illustrating a method 600 for creating and/or editing a machine pool, according to an embodiment of the present invention. Method 600 may begin at 605 with creating and/or editing a machine pool with a static list of machines. Machine pool (or cloud machine pool) may be defined as a configuration of machines such as cloud connection, cloud scope (e.g., resource group in Azure™, region in AWS™, and machine parameters (e.g., image, size, VNet, etc.). At 610, a user input machine list (UL) and an existing machine list (EL) is retrieved. In some embodiments, the user input machine list and the existing machine list are retrieved from the user of the BYOMs. The user input machine list may be defined as the desired state of the static list of the cloud machine identifiers and the existing machine list may be defined as the current state of the static list of the cloud machine identifiers. The user input machine list may include a unique identifier for each machine listed therein. Similarly, the existing machine list may include a unique identifier for each machine listed therein. A unique identifier helps to avoid double booking scenario for customers. For example, the customer may, at the same time, use a cloud machine in two different BYOM machine pools. With the unique identifier, the same machine being used in two different BYOM machine pools is identifiable, and a decision is made as to whether the same machine can be used by the second BYOM machine pool or not.

At 615, the user input machine list and the existing machine is compared to determine if the user input machine list contains any changes from that of the existing machine list. In some embodiments, one or more unique identifiers for any machine not listed in the existing machine list are identified by way of this comparison. In another embodiment, the user input machine list and the existing machine are merged together to identify one or more unique identifiers for any machine not listed in the existing machine list.

If the user input machine list and the existing machine list are identical, the existing machine specification for each of the machines identified in the existing machine list is used at 620. If the user input machine list and the existing machine list are different, a new machine specification is created at 625.

In some embodiments, a new machine specification may be defined as a version of the machine pool and is immutable. For example, when a new machine specification is created, there may be an underlying implication. Specifically, when a new machine specification is created, a license key associated with the new machine specification has to be located. This license key is a tool that allows a user (or machine) to connect back to UiPath® ecosystem (e.g., Orchestrator™). It should be noted that machines may belong to a machine specification and the machine specification holds the license key(s) shared by all machines when connected to the ecosystem.

The BYOM cloud machine pool may have more than one machines, and those machines may share the same license key to connect to Orchestrator™. The license key basically denotes the runtimes amount allocated and others information such as the number of endpoints in Orchestrator™. When pool editing happens, a change is introduced that invalidates part of the connected machines. Change may be defined as editing the site of the machine, change in resource group, etc. This is the time the shared license key is rotated. For example, the rotation works effectively to shut down the connection for invalid connected machines, and as a side effect, other connected machines are also invalidated. For this reason, the license key used on those machines is rotated.

Figure 7:
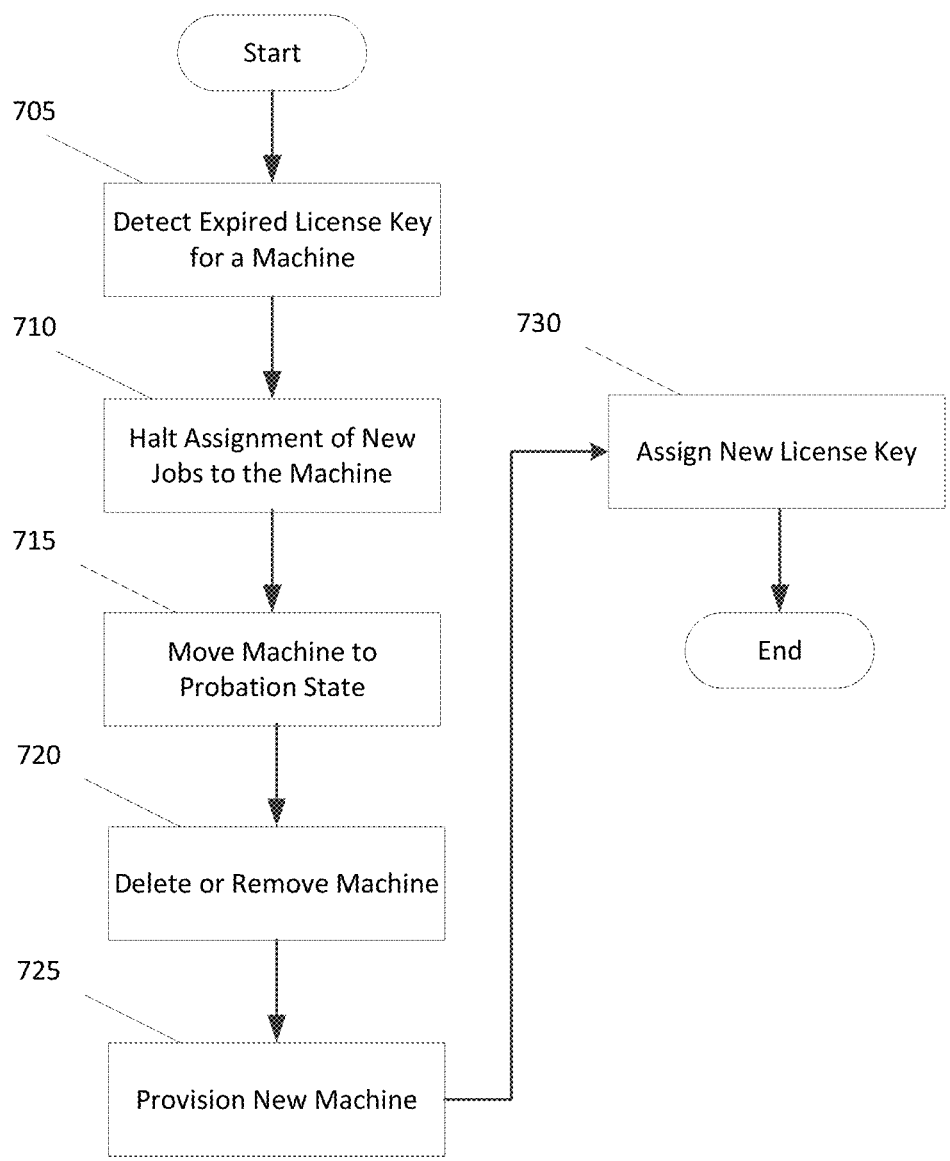
FIG. 7 is a flow diagram illustrating a method for rotating a license key, according to an embodiment of the present invention.

FIG. 7 is a flow diagram illustrating a method 700 for rotating a license key when a new machine specification is created, according to an embodiment of the present invention. In some embodiments, method 700 may begin at 705 with Orchestrator™ detecting that a machine needs to be rotated out of the machine pool. For example, Orchestrator™ may detect that the license key for the machine has expired. This may occur when the new specification is created (see explanation below). At 710, using the expired license key, Orchestrator™ halts assignment of any new job to the machine, and at 715, moves the machine to a probation state. For purposes of explanation, when a machine is in the probation state, no further jobs can be assigned to this machine though existing running jobs (if any) will continue their execution.

At 720, when the machine has completed one or more remaining jobs (if any), Orchestrator™ deletes the machine or removes the machine from the machine pool. At 725, Orchestrator™ provisions a new machine based on a new machine specification, and at 730, assigns a new license key to the new provisioned machine. In some alternative embodiments, the same machine may be provisioned and assigned a new license key. See explanation below.

The new license key is randomly generated and validated by Orchestrator™ for each version in the machine pool and notified to hypervisor, for example. In one example, Orchestrator™ may generate a new license key during each time the rotation of the license key is required. In another example, Orchestrator™ may generate a new license prior to rotation of the license key. Also, it should be noted that Orchestrator™ may determine when a new job is pending. Orchestrator™ side may differentiate the connection based on the license key that is used, even if the license key is from the same machine. Orchestrator™ uses two properties—(1) reviewing the host machine name from physical machine and (2) reviewing the license key being used—to identify a unique robot connection.

It should be appreciated that Orchestrator™ uses two elements to identify a machine, i.e., the license key, which identifies the pool, and the machine name (e.g., the computer name), which identifies the machine. When rotating the key, a new version of the machine is created in Orchestrator™ database. The new version becomes active and the older version inactive. The license key is what identifies which version the machine is on. With Autoscaling™, machine that is on a deprecate version is identified. This places the machine in probation, which means no more job can be assigned to this machine. This is to ensure that additional job are not assigned when disconnecting the machine. This also allows the machine to be disconnected safely and not drop already running jobs. In the case of BYOM embodiment, the same machine can connect again using the new license key. However, in some or most cases, a new machine using a new license key is connected.

Returning to FIG. 6, at 630, once the new machine specification is created and a new task is assigned. Additionally, the following operations may be performed. First, new machines may be added to the new machine specification, and existing machines may be moved from the old machine specification to the new machine specification. The moving of the existing machines are for those that remain or are identified in the user input machine list. Those machines that belong to a different pool or do not belong to the user input machine list are skipped. This is generally performed by using a global identifier.

In some alternative embodiments, rather than completely removing or deleting machines, those machines not identified in user input machine list are soft deleted. For instance, rather than deleting the machine, the machine is marked as being hidden, effectively removing the machine from the purview of the existing machine list. This may apply to unresponsive machines. These unresponsive machines may be moved to a stop state, for example.

Figure 8:
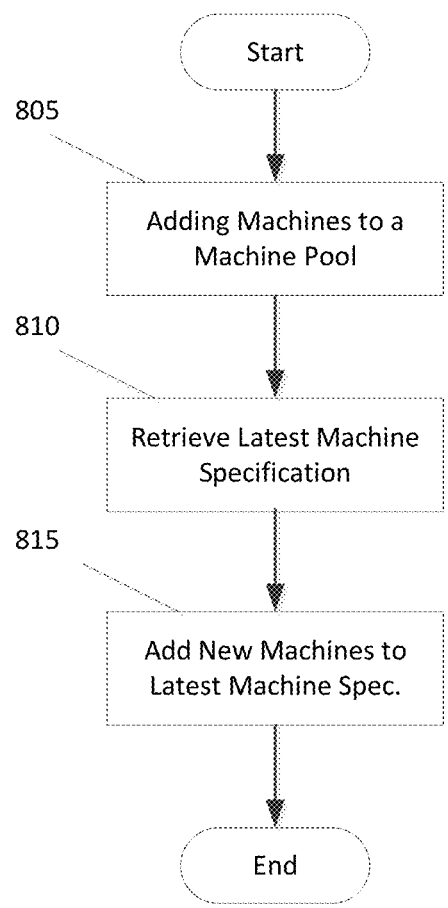
FIG. 8 is a flow diagram illustrating a method for adding machines to a machine pool, according to an embodiment of the present invention.

FIG. 8 is a flow diagram illustrating a method 800 for adding machines to a machine pool, according to an embodiment of the present invention. In some embodiments, a new machine specification may have not been created, avoiding the need to rotate a license key. In those embodiments, method 800 begins at 805 with adding machines to a machine pool. User provides the list of cloud machine identifiers to add. Rather than creating a new machine specification, the latest (or current) machine specification is retrieved at 810. At 815, new machines are added to the latest machine specification, and is marked as stopped, so it would be considered to utilize in the future. For other existing machines, no further modification is performed.

Figure 9:
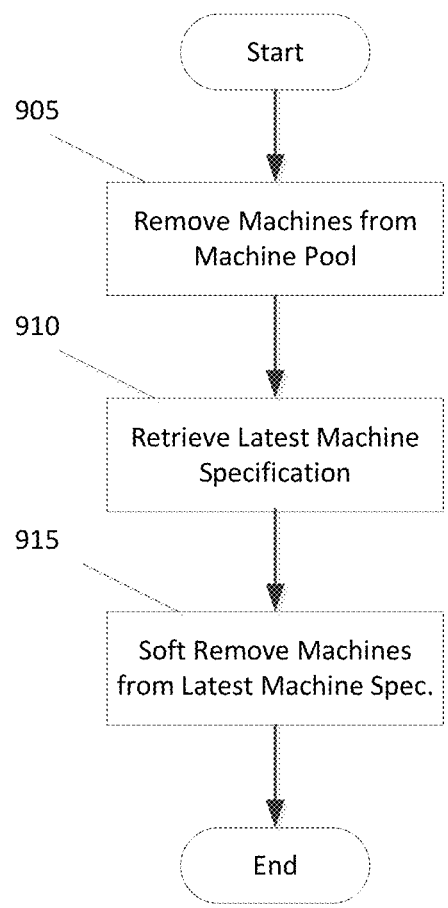
FIG. 9 is a flow diagram illustrating a method for removing machines to a machine pool, according to an embodiment of the present invention.

FIG. 9 is a flow diagram illustrating a method 900 for removing machines to a machine pool, according to an embodiment of the present invention. Method 900 may begin at 905 with removing machines from a machine pool. User provides a list of cloud machine identifiers to remove. At 910, rather than creating a new machine specification, the latest (or current) machine specification is retrieved. At 915, machines are soft removed from the latest machine specification for machines that belong to the latest machine specification and are in a stopped state without a pending task. All other machines are skipped.

Figure 10:
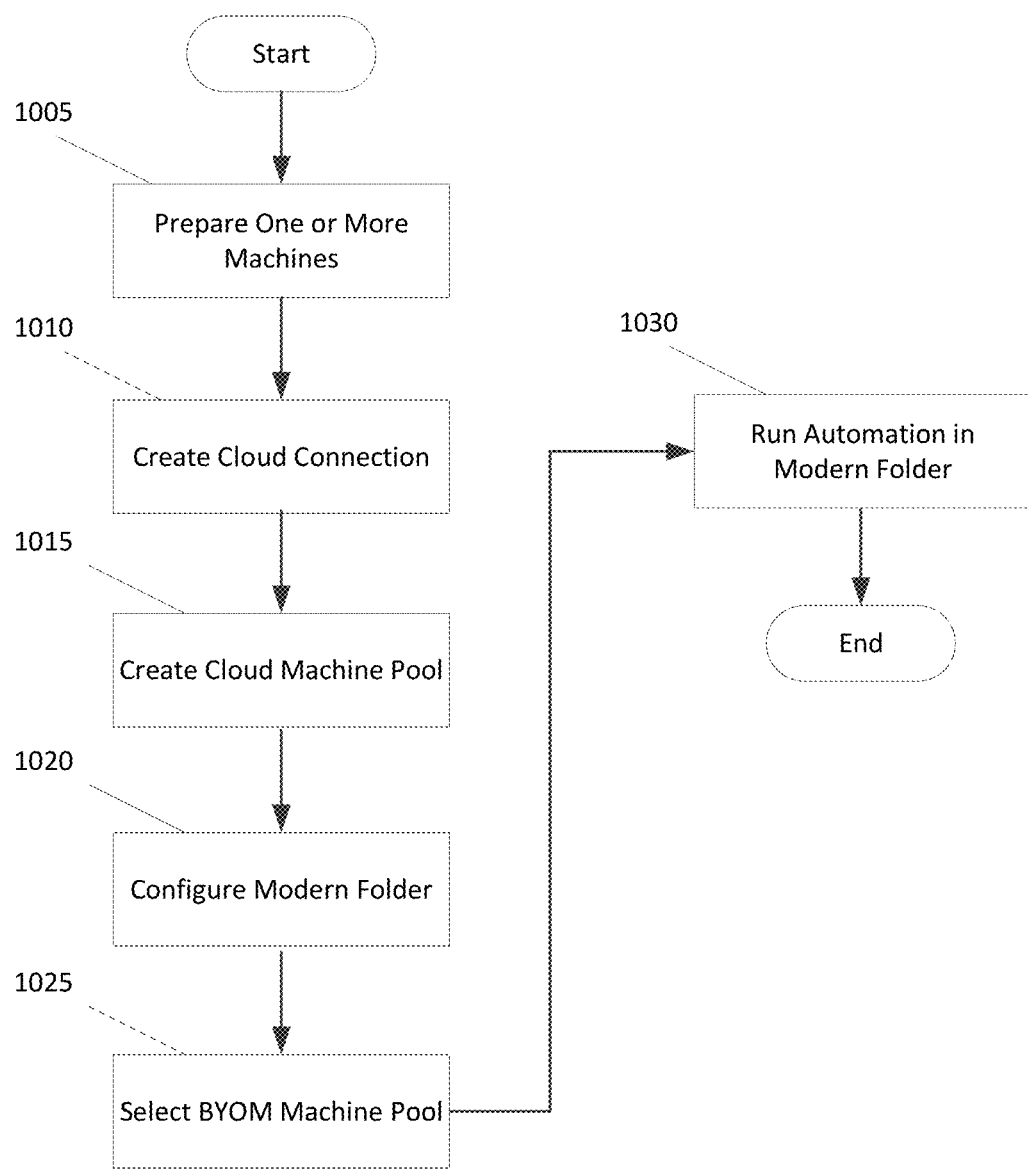
FIG. 10 is a flow diagram illustrating a method 900 for bringing your own machine (BYOM), according to an embodiment of the present invention.
Figure 11:
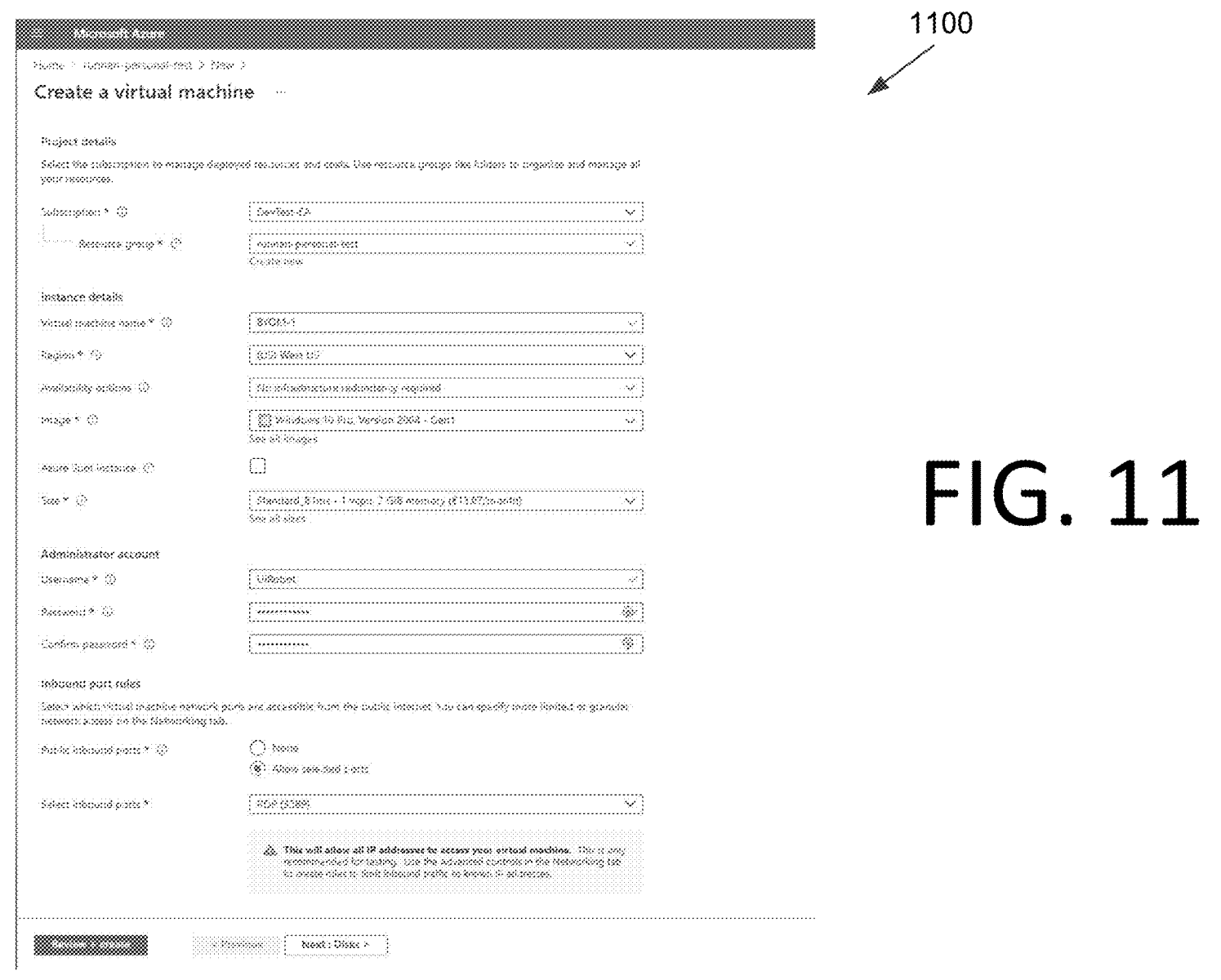
Figure 12:
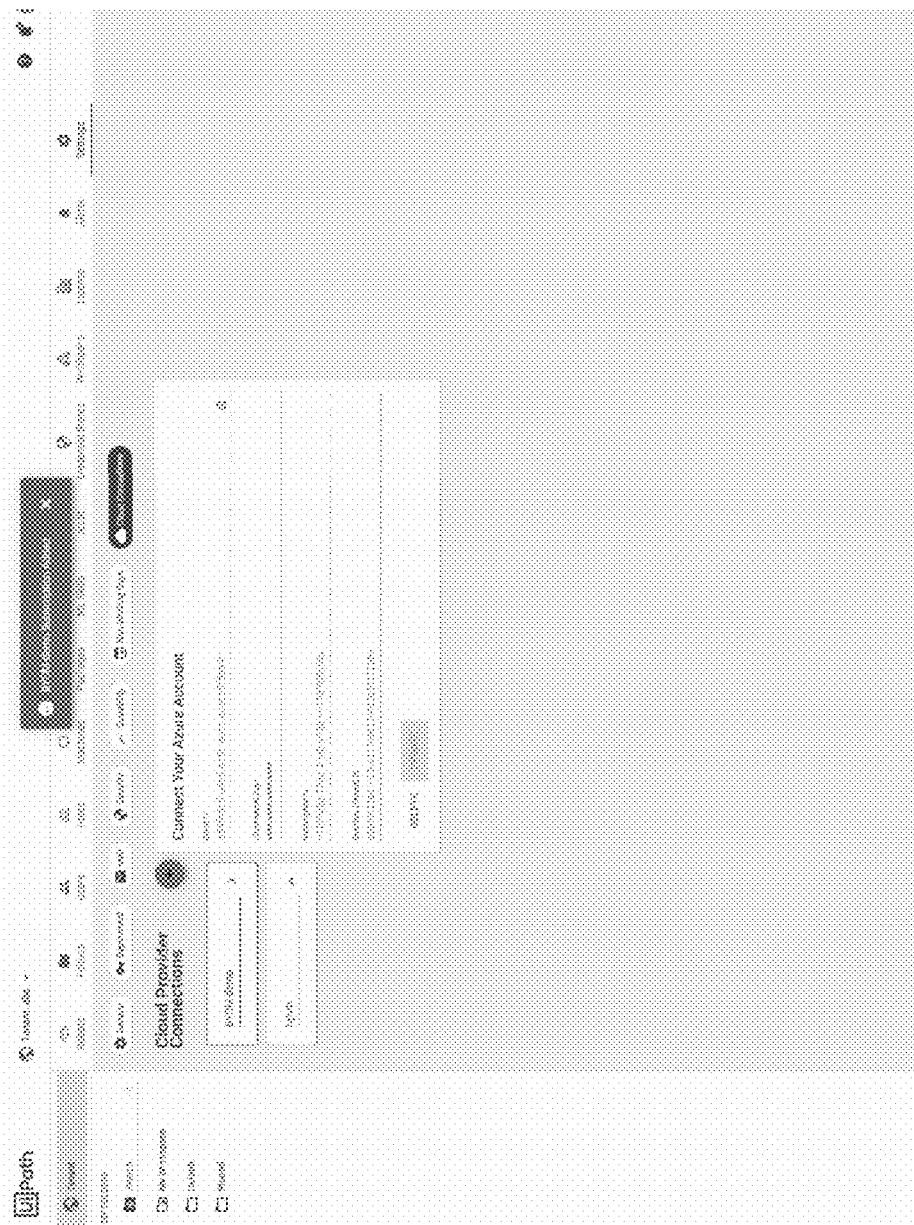
FIG. 12 is a GUI illustrating cloud provider connections, according to an embodiment of the present invention.

FIG. 10 is a flow diagram illustrating a method 1000 for bringing your own machine (BYOM), according to an embodiment of the present invention. Method 1000 may begin at 1005 with a user preparing one or more machines in their subscription service (e.g., Azure™ or AWS™). See FIG. 11, which is a GUI 1100 illustrating a user creating a virtual machine, according to an embodiment of the present invention. At 1010, the user creates a cloud connection in Orchestrator™, for example. See FIG. 12, which is a GUI 1200 illustrating cloud provider connections, according to an embodiment of the present invention.

Figure 13:
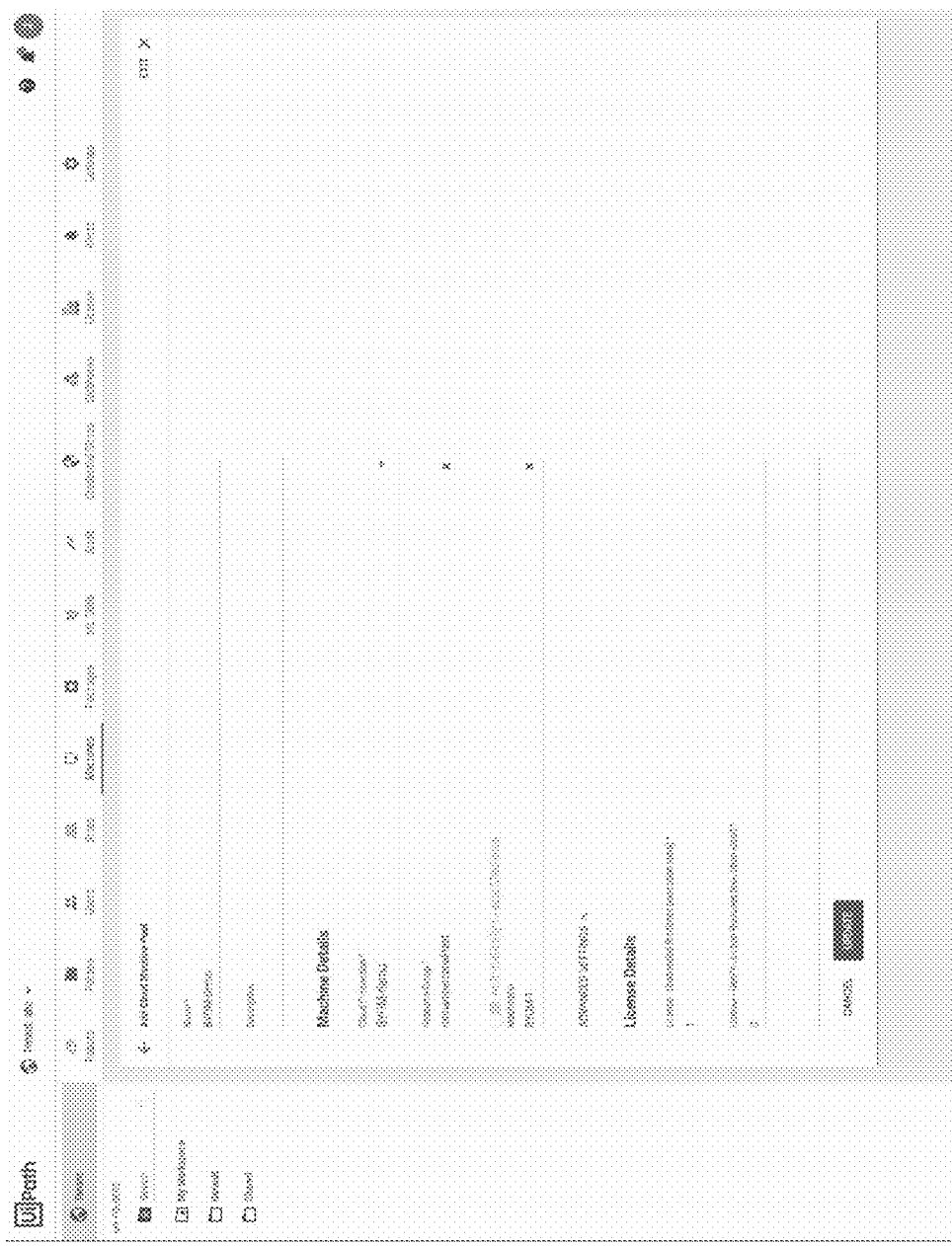
FIG. 13 is a GUI illustrating adding of a cloud machine pool, according to an embodiment of the present invention.
Figure 14:
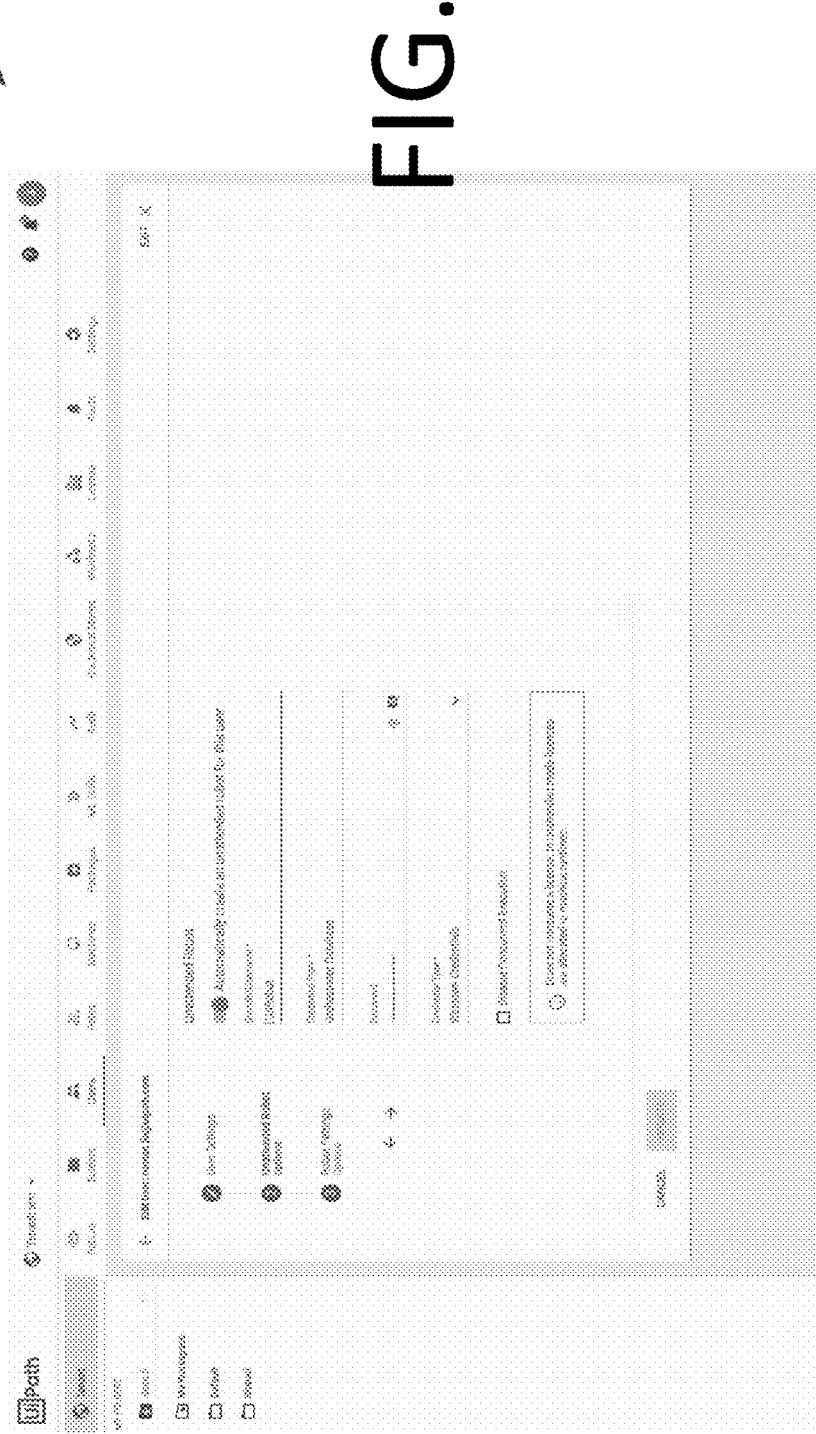
FIG. 14 is a GUI illustrating the configuring of the modern folder, according to an embodiment of the present invention.

At 1015, the user creates a cloud machine pool in Orchestrator™. See FIG. 13, which is a GUI 1300 illustrating adding of a cloud machine pool, according to an embodiment of the present invention. In some embodiments, the user toggles the "Automatically Create Machines" off and select machines he or she wants to add in the machine pool. At 1020, the user configures the modern folder. Modern folder comprises features that are otherwise not available in a traditional folder. BYOM is part of those features. See FIG. 14, which is a GUI 1400 illustrating the configuring of the modern folder, according to an embodiment of the present invention. In some embodiments, the user configures unattended robot username and password. This may be similar to the machine creation flow in step 1005 of FIG. 9.

Figure 15:
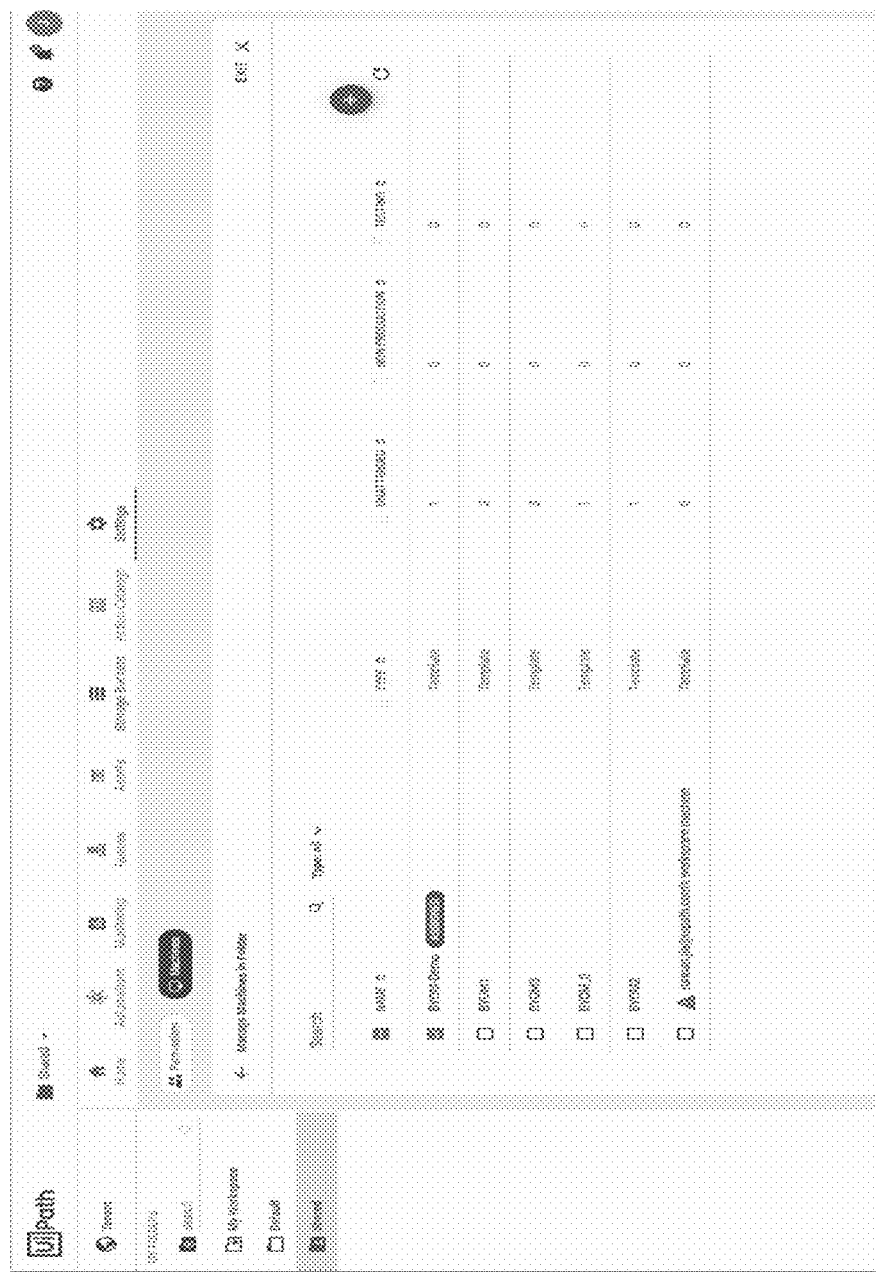
FIG. 15 is a GUI illustrating managing of the machines in the folder, according to an embodiment of the present invention.
Figure 16:
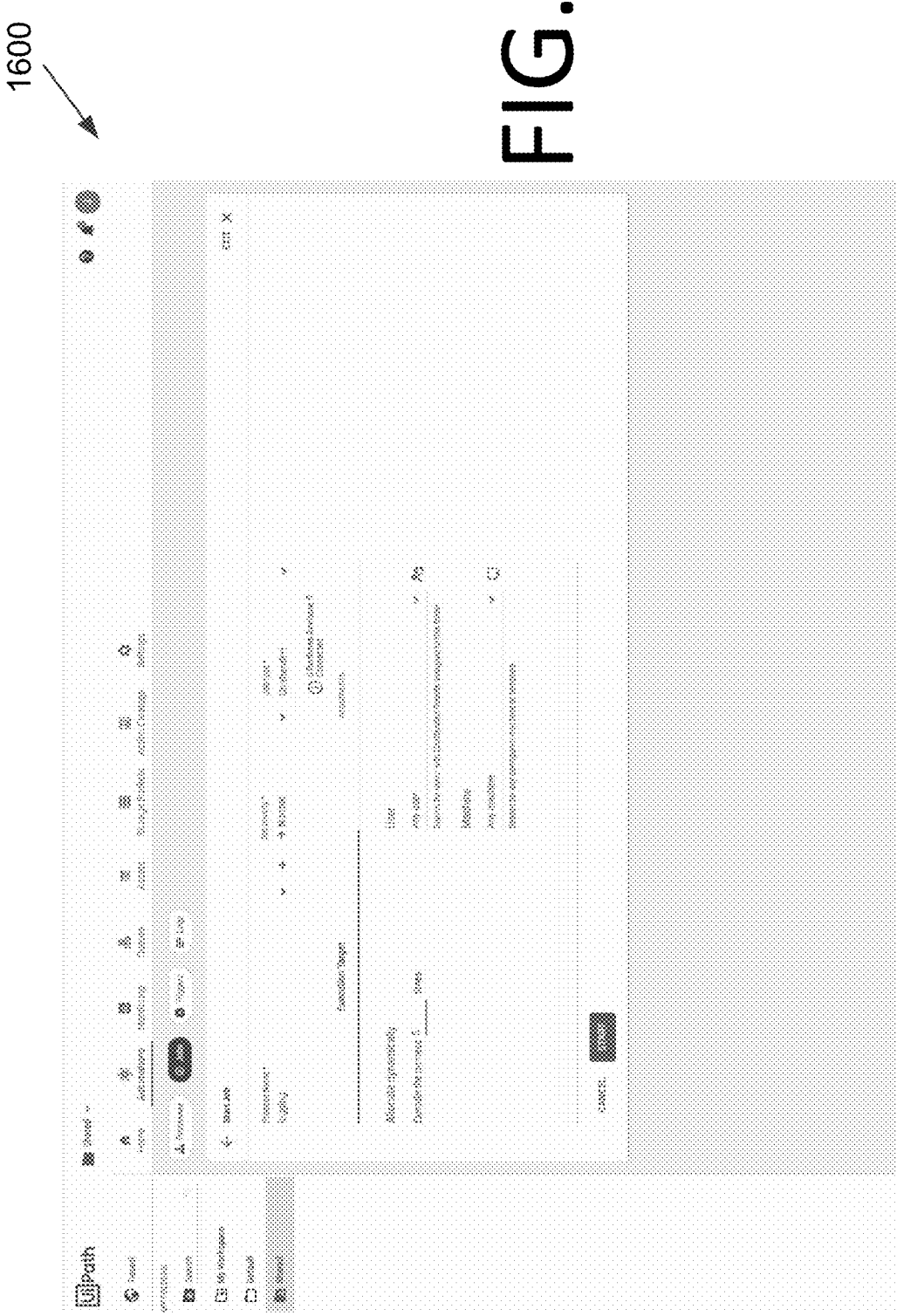
FIG. 16 is a GUI illustrating the executing of the job, according to an embodiment of the present invention.

At 1025, the user continues to configure the modern folder, i.e., selects the BYOM machine pool in the machines sector. See FIG. 15, which is a GUI 1500 illustrating managing of the machines in the folder, according to an embodiment of the present invention. At 1030, the user may run or execute the automation in the modern folder. See FIG. 16, which is a GUI 1600 illustrating the executing of the job, according to an embodiment of the present invention.

Figure 17:
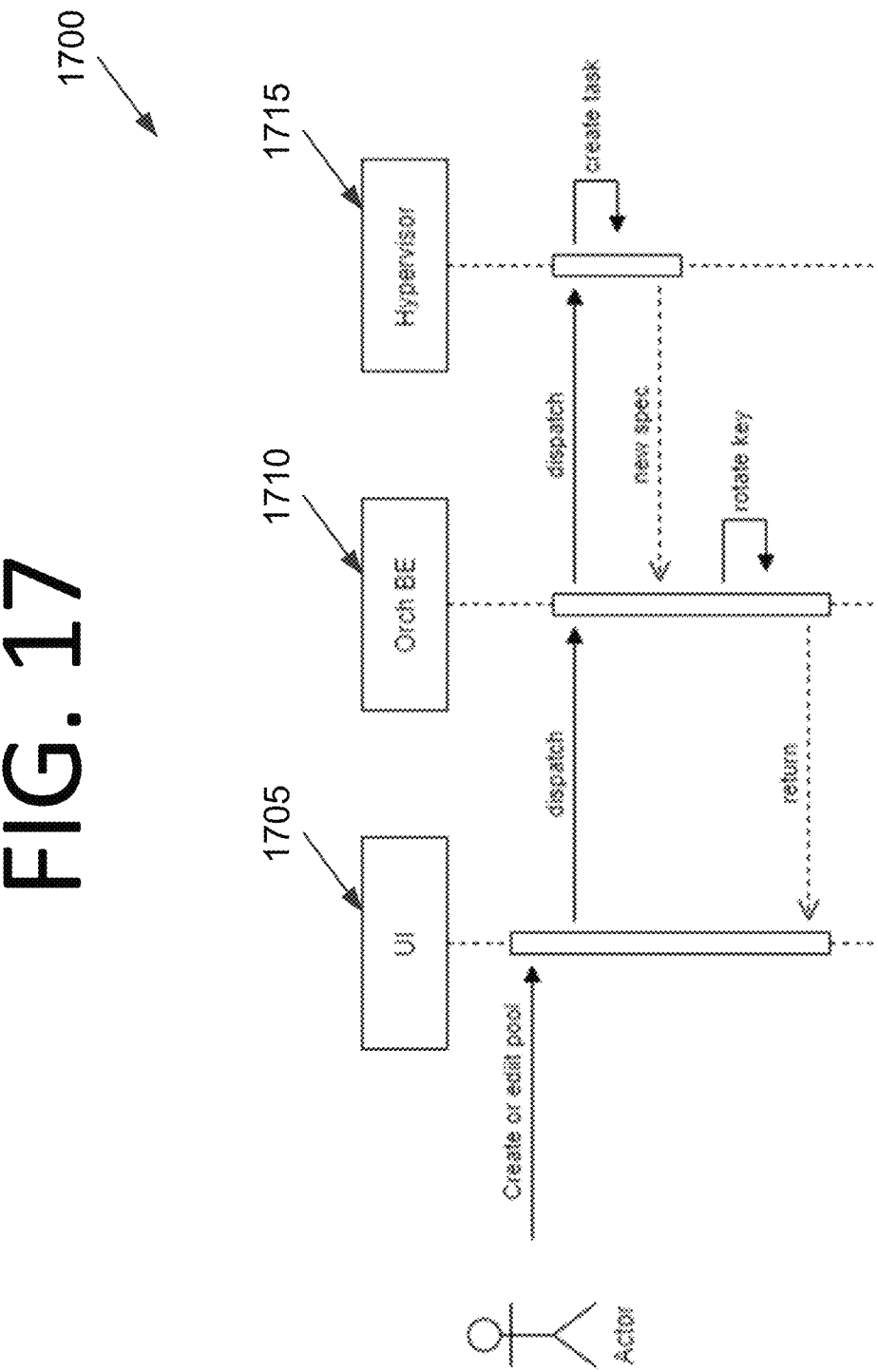
FIG. 17 is a diagram illustrating a flow for creating/editing a machine pool and rotating a license key, according to an embodiment of the present invention.

FIG. 17 is a diagram illustrating a flow 1700 for creating/editing a machine pool and rotating a license key, according to an embodiment of the present invention. In some embodiments, the user (or actor) may access a user interface 1705 to create or edit a machine pool. Using an application programming interface (API), a request for the creation and/or editing of the machine pool is transmitted from user interface 1705 to Orchestrator™ 1710. Orchestrator™ 1710 relays the request to hypervisor 1715. Hypervisor 1715 scans the request to determine if a new machine specification is required. Examples of a new machine specification includes adding or removing machines from the machine pool and changing the size or the image of the machine, to name a few. If required, hypervisor 1715 creates a new machine specification and transmits the new machine specification to Orchestrator™ 1710. Separately and asynchronously, hypervisor 1715 decides if a new task is required, and if required, creates a new task. For example, when creating a new machine specification, hypervisor 1715 creates a task to execute asynchronously (but still in hypervisor 1715) to import one or more new machines from the (new) user input machine list to the new machine specification. See step 630 in FIG. 6. Because in the response hypervisor 1715 provides a new machine specification, Orchestrator™ rotates the license key, which is a synchronous operation. Such operation includes creating a new version and persist the new license key (see 1815) while resetting the 'IsActive' bit on the previous version. Using method 700 of FIG. 7, Orchestrator™ may rotate the license key and license key to user interface 1705.

Figure 18:
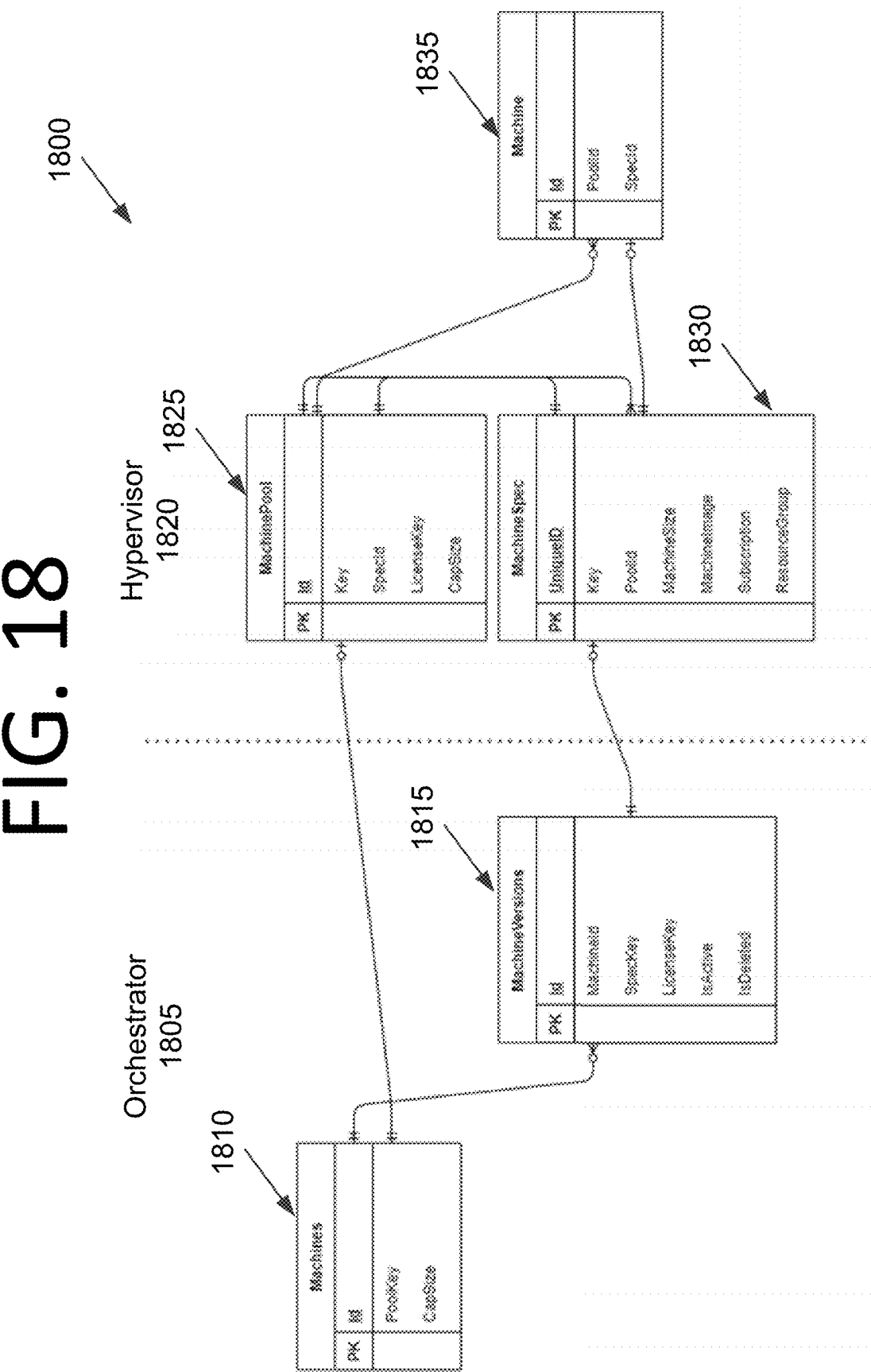
FIG. 18 is a diagram illustrating an architectural relationship between a hypervisor and orchestrator entities, according to an embodiment of the present invention.

FIG. 18 is a diagram illustrating an architectural relationship 1800 between a hypervisor and orchestrator entities, according to an embodiment of the present invention. In some embodiments, on Orchestrator™ 1805 side, machines module 1810 includes a table containing a pool key. Not visible to the user, machines module 1810 is linked to machine versions module 1815. Machine versions module 1815 includes a license key that may be required to rotate. When the license key is rotated, a new license key is activated in machine versions module and the expired license key is revoked.

On hypervisor 1820 side, when a machine pool 1825 is created, machine pool 1825 and machines module 1810 are linked, and a pool key is stored therein. A machine specification module 1830 is also created, and includes a license key associated with the machine versions module 1815. This is accomplished by linking machine specification module 1830 and machine versions module 1815. Also linked is machine module 1835 to machine pool module 1825 and machine specification 1830.

FIG. 19 is a relationship diagram 1900 illustrating a statement machine of a machine, according to an embodiment of the present invention. In the general case, the machine is created and added to the machine pool by cloud robots. In some embodiments, however, and in particular, in the BYOM embodiment, the machine is created by the customer or user of the machine. The machine is incorporated to the machine pool in the background. Machine may then go to connected and disconnected many times based on the load. This is true for any type of machine pool. For example, if a machine fails (i.e., does not connect properly, does not respond to a command, etc.), the machine is considered faulty and gets deleted. Hard deletion in the general case versus eviction in the BYOM case.

The process steps performed in FIGS. 6-10 may be performed by a computer program, encoding instructions for the processor(s) to perform at least part of the process(es) described in FIGS. 6-10, in accordance with embodiments of the present invention. The computer program may be embodied on a non-transitory computer-readable medium. The computer-readable medium may be, but is not limited to, a hard disk drive, a flash device, RAM, a tape, and/or any other such medium or combination of media used to store data. The computer program may include encoded instructions for controlling processor(s) of a computing system (e.g., processor(s) 510 of computing system 500 of FIG. 5) to implement all or part of the process steps described in FIGS. 6-10, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, an ASIC, or any other suitable device.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A computer-implemented method for creating and/or editing a machine pool with bring your own machine (BYOM), comprising:
   creating and/or editing a machine pool with a static list of cloud machines;
   retrieving a user input machine list and an existing machine list, and comparing the user input machine list and existing machine list to identify one or more changes between the user input machine list and existing machine list;
   creating a new machine specification when the one or more changes between the user input machine list and existing machine list are identified, the new machine specification is a version of a machine pool and is immutable, wherein
   creating the new machine specification comprises locating a license key associated with the new machine specification; and
   moving or importing one or more cloud machines to the new machine specification.

2. The computer-implemented method of claim 1, wherein creating the new machine specification comprises
   replacing an expired license key with a new license key, when the new machine specification is created, wherein the new license key facilitates the one or more cloud machines to connect to a cloud based ecosystem.

3. The computer-implemented method of claim 2, wherein the replacing of the new license key for the expired license key comprises
   randomly generating the new license key for the new machine specification in the machine pool prior to replacement of the new license key with the expired license key.

4. The computer-implemented method of claim 2, wherein the replacing of the new license key for the expired license key comprises identifying a machine for rotation out of the machine pool when the expired license key is detected or when the new machine specification is created.

5. The computer-implemented method of claim 4, wherein the rotating of the new license key for the expired license key comprises
halting assignments of one or more new jobs to the identified machine, and
moving the identified machine to a probation state.

6. The computer-implemented method of claim 5, wherein the rotating of the new license key for the expired license key comprises:
deleting the machine in the probation state from the machine pool.

7. The computer-implemented method of claim 6, wherein the rotating of the new license key for the expired license key comprises:
provisioning a new machine based on the new machine specification, and
assigning a new license key to a new machine based on a new machine specification.

8. A computer program embodied on a non-transitory computer readable medium, the computer program is configured to cause one or more processors to create and/or edit a machine pool with bring your own machine (BYOM), the computer program is further configured to cause the one or more processors to:
create and/or edit a machine pool with a static list of cloud machines;
retrieve a user input machine list and an existing machine list, and comparing the user input machine list and existing machine list to identify one or more changes between the user input machine list and existing machine list;
create a new machine specification when the one or more changes between the user input machine list and existing machine list are identified, the new machine specification is a version of a machine pool and is immutable, wherein
creating the new machine specification comprises locating a license key associated with new machine specification; and
move or importing one or more cloud machines to the new machine specification.

9. The computer program of claim 8, wherein the computer program is further configured to cause the one or more processors to:
replacing an expired license key with a new license key, when the new machine specification is created, wherein the new license key facilitates the one or more cloud machines to connect to a cloud based ecosystem.

10. The computer program of claim 9, wherein the computer program is further configured to cause the one or more processors to:
randomly generate the new license key for the new machine specification in the machine pool prior to replacement of the new license key with the expired license key.

11. The computer program of claim 10, wherein the computer program is further configured to cause the one or more processors to:
identify a machine for rotation out of the machine pool when the expired license key is detected or when the new machine specification is created.

12. The computer program of claim 11, wherein the computer program is further configured to cause the one or more processors to:
halt assignments of one or more new jobs to the identified machine, and
move the identified machine to a probation state.

13. The computer program of claim 12, wherein the computer program is further configured to cause the one or more processors to:
delete the machine in the probation state from the machine pool.

14. The computer program of claim 12, wherein the computer program is further configured to cause the one or more processors to:
provision a new machine based on the new machine specification, and
assign a new license key to a new machine based on a new machine specification.

15. A system to create and/or edit a machine pool with bring your own machine (BYOM), comprising:
memory configured to store one or more computer-executable instructions; and
one or more processors configured to execute the one or more instructions to perform:
creating and/or editing a machine pool with a static list of cloud machines;
retrieving a user input machine list and an existing machine list, and comparing the user input machine list and existing machine list to identify one or more changes between the user input machine list and existing machine list;
creating a new machine specification when the one or more changes between the user input machine list and existing machine list are identified, the new machine specification is a version of a machine pool and is immutable, wherein
creating the new machine specification comprises locating a license key associated with the new machine specification; and
moving or importing one or more cloud machines to the new machine specification.

16. The system of claim 15, wherein the one or more processors are further configured to execute the one or more instructions to perform:
replacing an expired license key with the new license key, when the new machine specification is created, wherein the new license key facilitates the one or more cloud machines to connect to a cloud based ecosystem.

17. The system of claim 16, wherein the one or more processors are further configured to execute the one or more instructions to perform:
randomly generating the new license key for the new machine specification in the machine pool prior to replacing of the new license key with the expired license key.

18. The system of claim 17, wherein the one or more processors are further configured to execute the one or more instructions to perform:
identifying a machine for replacement of the machine pool when the expired license key is detected or when the new machine specification is created.

19. The system of claim 18, wherein the one or more processors are further configured to execute the one or more instructions to perform:
halting assignments of one or more new jobs to the identified machine, and
moving the identified machine to a probation state.

20. The system of claim 19, wherein the one or more processors are further configured to execute the one or more instructions to perform:

deleting the machine in the probation state from the machine pool.

21. The system of claim 20, wherein the one or more processors are further configured to execute the one or more instructions to perform:

provisioning a new machine based on the new machine specification, and assigning a new license key to a new machine based on a new machine specification.

\* \* \* \* \*